(12) United States Patent
Van Loon et al.

(10) Patent No.: US 10,549,515 B2
(45) Date of Patent: Feb. 4, 2020

(54) METHODS FOR MAKING MULTILAYER FILMS AND FILMS MADE THEREBY

(71) Applicant: ExxonMobil Chemical Patents Inc., Baytown, TX (US)

(72) Inventors: Achiel J. Van Loon, Schoten (BE); Willy J. Leysen, Shanghai (CN); Qina Chen, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 736 days.

(21) Appl. No.: 14/533,811

(22) Filed: Nov. 5, 2014

(65) Prior Publication Data

US 2015/0158235 A1   Jun. 11, 2015

(30) Foreign Application Priority Data

Dec. 10, 2013   (WO) ................ PCT/CN2013/001529

(51) Int. Cl.
  *B32B 27/32*   (2006.01)
  *B32B 27/08*   (2006.01)
  *B29K 23/00*   (2006.01)
  *B29K 105/00*  (2006.01)

(52) U.S. Cl.
  CPC .............. *B32B 27/32* (2013.01); *B32B 27/08* (2013.01); *B29K 2023/06* (2013.01); *B29K 2023/12* (2013.01); *B29K 2105/0088* (2013.01); *B32B 2250/05* (2013.01); *B32B 2250/242* (2013.01); *Y10T 428/24992* (2015.01)

(58) Field of Classification Search
  CPC ..... B32B 27/32; B32B 27/08; B32B 2250/05; B32B 2250/40
  See application file for complete search history.

(56) References Cited

U.S. PATENT DOCUMENTS

| | | | |
|---|---|---|---|
| 5,741,563 A | 4/1998 | Mehta et al. | |
| 6,342,566 B2 | 1/2002 | Burkhardt et al. | |
| 6,368,545 B1 * | 4/2002 | Bailey | B29C 48/30 264/514 |
| 6,384,142 B1 | 5/2002 | Burkhardt et al. | |
| 2009/0110913 A1 | 4/2009 | Vinck et al. | |
| 2010/0119745 A1 * | 5/2010 | Nieto | B32B 7/02 428/35.7 |
| 2010/0215933 A1 * | 8/2010 | Fiscus | B32B 27/32 428/220 |
| 2011/0003099 A1 | 1/2011 | Vinck | |
| 2013/0281596 A1 * | 10/2013 | Mohan | C08L 23/16 524/427 |

FOREIGN PATENT DOCUMENTS

| | | |
|---|---|---|
| WO | 98/37143 | 2/1997 |
| WO | 97/19991 | 6/1997 |
| WO | 03/040201 | 5/2003 |

* cited by examiner

*Primary Examiner* — Jacob T Minskey
*Assistant Examiner* — Cedrick S Williams

(57) ABSTRACT

Disclosed are methods for making a multilayer film comprising a propylene-based elastomer by a blown film coextrusion line and films produced thereby.

8 Claims, 6 Drawing Sheets

Sample 1

Samples 2-5

METHODS FOR MAKING MULTILAYER FILMS AND FILMS MADE THEREBY

CROSS-REFERENCE TO RELATED APPLICATIONS

This application is a continuation of and claims priority to International Patent Application No. PCT/CN2013/001529, filed Dec. 10, 2013, the disclosure of which is incorporated by reference in its entirety.

FIELD OF THE INVENTION

This invention relates to methods for making a film, and in particular, to methods for making a multilayer film by a blown film coextrusion line, and to films produced thereby.

BACKGROUND OF THE INVENTION

The manufacture of coextruded blown films and the equipment for making them are well known in the art. Multilayer films have been made in which at least one surface or outer layer are made to facilitate heat-sealing. A core film layer may be used to provide strength, impact resistance, stretchability, other main physical properties of the film, or combinations thereof. Layers between the outer layer and core layer, also referred to as inner layers in this context, may facilitate the mutual adhesion of the layers and/or may impart barrier properties against the transmission of moisture, carbon dioxide, oxygen, other gases and the like.

Polymers used in such processes for packaging applications generally include polyethylene, polypropylene, ethylene vinyl alcohol, and the like. Film properties are often subject to the combined effect of the coextrusion process conditions and polymer compositions selected for the different layers. Film producers have to balance mechanical properties such as stiffness and impact strength to make stronger films for a given thickness, and optical properties such as clarity and haze which impact the attractiveness of the packaging and visual inspection of the goods at the point of sale.

Higher clarity is usually achieved in blown film applications by the inclusion of softer polyolefins, such as very low density polyethylene (LLDPE), usually in combination with other polyethylene polymers, including low density polyethylene (LDPE), linear polyethylene, and high density polyethylene (HDPE), in different layers. Such materials, while offering benefits in clarity, often result in negative effects on the mechanical properties. Various attempts to optimize this balance continue to restrict the range of stiffness. Introduction of higher amounts of metallocene polyethylenes (mPEs) into multilayer films with reduced use of LDPE provides improved mechanical performance. Efforts to provide a good solution for high clarity films include incorporating mPE with a higher density, optionally in a blend with high density polyethylene (HDPE), in the core layer and another mPE with a lower density in the outer layer. Although improved optical properties including high clarity and low haze are achieved, stiffness of the film is usually very high, making the film undesirable for packaging applications requiring soft hand feel.

U.S. Pat. No. 6,368,545 discloses techniques to achieve higher clarity in multilayer blown coextruded films. The core layer may be extruded at a higher temperature than the skin layer or layers, and/or the core layer has a higher density than the skin layer or layers.

U.S. Patent Application No. 2009/0110913 provides a blown film coextrusion process. The process involves extruding core contact layers through a die exit at a specified speed and cooling, orienting, and crystallizing the multilayer film formed at a specified deformation rate to form a frost line at a specified distance from the die exit by withdrawing film at a take up speed. The core and core contact layers are of a film forming polymer composition comprising at least 90 wt % of ethylene-based polymer. The ethylene-based polymer of the core layer has an average density of ethylene-based polymers equal to or higher than that of ethylene-based polymer of the core contact layers. The invention specifically concerns the feature that the core layer composition contains a portion of LDPE and the composition of the core contact layers contain a portion of a linear polyethylene so as to make the core layer more resistant to deformation than the skin layers.

U.S. Patent Application No. 2011/0003099 relates to the use of linear polyethylene having an MIR indicative of the presence of some long-chain branching having a density of 0.91 to 0.94 g/cm$^3$ determined according to ASTM D4703/D1505, an $I_{2.16}$ (MI) of from 0.05 to 1 g/10 min, and $I_{21.6}/I_{2.16}$ (MIR) of more than 35, the MI and MIR being determined according to ASTM 1238 D at 190° C., and a difference between the MD Tensile force based on ASTM D882-02 at 100% elongation and MD 10% and the offset yield of a reference film is defined herein having a thickness of 25 μm of at least 15 MPa. The invention also relates to coextruded film structures made using such linear polyethylene in the core layer of a multi-layer structure to provide easily processed, strong, highly transparent films.

As discussed above, there is a need therefore for a film and/or a method for making a film that can deliver low stiffness to a blown multilayer film without compromising optical properties, such as high clarity. One alternative to address the above stiffness problem is to apply a propylene-based elastomer to a conventional multilayer film. Applicant has discovered that during bubble blowing of a blown coextrusion process, introduction of a propylene-based elastomer into inner layers of the bubbles can create a strong adhesion between the two inner surfaces of the bubble when the bubble collapses. As a result, the two surfaces can turn into one layer serving as the core layer of the film. Thus, the number of layers in a film can be greater than the number of extruders in the coextrusion line, as represented by a function relation of (2n−1), with n being the number of extruders. Therefore, under a given film thickness and a limited scale of a coextrusion line with, for example, three extruders, a five-layer film comprising a propylene-based elastomer in the core layer can be produced to obtain lower stiffness, preferably combined with improved optical properties and other mechanical properties.

SUMMARY OF THE INVENTION

Provided are methods for making a multilayer film by a coextrusion line, and films made thereby.

In one embodiment, the invention encompasses a method for making a multilayer film by a coextrusion line comprising two extruders, comprising the steps of: (a) extruding a core layer from a first extruder; (b) extruding two outer layers from a second extruder; and (c) combining the core layer and the two outer layers to form a multilayer film; wherein the core layer (i) comprises a propylene-based elastomer having at least about 60 wt % propylene-derived units and about 3 to about 25 wt % ethylene-derived units, based on total weight of the propylene-based elastomer, and a heat of fusion of less than about 80 J/g; (ii) is between the two outer layers; and (iii) has an equal number of layer(s) on both sides of it; wherein at least one outer layer comprises from about 50 to about 100 wt % of a polyethylene. Preferably, the film comprises at least one inner layer between each outer layer and the core layer. More preferably, at least one inner layer has a density higher than that of either outer layer. Preferably, the film is symmetrical.

In another embodiment, the present invention relates to a multilayer film comprising: (a) in a core layer a propylene-based elastomer has at least about 60 wt % propylene-derived units and about 3 to about 25 wt % ethylene-derived units, based on total weight of the propylene-based elastomer, and a heat of fusion of less than about 80 J/g; (b) in two outer layers a blend of two polyethylenes, wherein the core layer is between the two outer layers; and (c) in two inner layers a blend of two polyethylenes, wherein each inner layer is between the core layer and each outer layer; wherein each inner layer has a density at least about 0.006 g/cm$^3$ higher than that of the outer layer, wherein the two outer layers are identical and the two inner layers are identical. Preferably, the film is a five-layer film made by a blown coextrusion line with three extruders. More preferably, the film has at least one of the following: (a) a stiffness (1% Secant Modulus) of at least about 20% lower than that of a comparative film in both the Machine Direction (MD) and the Transverse Direction (TD), (b) a haze at least about 20% lower than that of a comparative film, (c) a dart impact at least about 50% higher than that of a comparative film in the Machine Direction (MD).

DETAILED DESCRIPTION OF THE PRESENT INVENTION

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

For purposes of this invention and the claims thereto, an ethylene polymer having a density of 0.86 g/cm$^3$ or less is referred to as an "ethylene elastomer"; an ethylene polymer having a density of more than 0.86 to less than 0.910 g/cm$^3$ is referred to as an "ethylene plastomer"; an ethylene polymer having a density of 0.910 to 0.940 g/cm$^3$ is referred to as a "low density polyethylene" (LDPE); and an ethylene polymer having a density of more than 0.940 g/cm$^3$ is referred to as a "high density polyethylene" (HDPE).

Polyethylene having a density of 0.890 to 0.930 g/cm$^3$, typically from 0.915 to 0.930 g/cm$^3$, that is linear and does not contain long-chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors. "Linear" means that the polyethylene has no or only a few long-chain branches, typically referred to as a g'vis of 0.97 or above, preferably 0.98 or above.

As used herein, "core" layer, "outer" layer, and "inner" layer are merely identifiers used for convenience, and shall not be construed as limitation on individual layers, their relative positions, or the laminated structure, unless otherwise specified.

As used herein, when a film is referred to as "symmetrical", it contains layers on one side of the core layer that are mirror images of those on the other side relative to the core layer.

As used herein, film layers that are the same in composition and in thickness are referred to as "identical" layers.

As used herein, a "comparative film" refers to a film free of the core layer comprising the propylene-based elastomer, but is otherwise identical in terms of layers' compositions and the film's overall thickness, compared to the referenced film.

As used herein, a film "free of" the core layer comprising the propylene-based elastomer described herein refers to a film substantially devoid of such core layer, or comprising such core layer in an amount of less than about 0.01%, by volume of the total film.

The present invention relates to a method for making a multilayer film by a coextrusion line comprising two extruders, comprising the steps of: (a) extruding a core layer from a first extruder; (b) extruding two outer layers from a second extruder; and (c) combining the core layer and the two outer layers to form a multilayer film; wherein the core layer (i) comprises a propylene-based elastomer having at least about 60 wt % propylene-derived units and about 3 to about 25 wt % ethylene-derived units, based on total weight of the propylene-based elastomer, and a heat of fusion of less than about 80 J/g, (ii) is between the two outer layers, and (iii) has an equal number of layer(s) on both sides of it; wherein at least one outer layer comprises from about 50 to about 100 wt % of a polyethylene.

Propylene-based Elastomer

The multilayer film made by the method of the present invention comprises in the core layer a propylene-based elastomer. Preferably, the propylene-based elastomer has at least about 60 wt % propylene-derived units and about 3 to about 25 wt % ethylene-derived units, based on total weight of the propylene-based elastomer, and a heat of fusion of less than about 80 J/g. Preferably, the propylene-based elastomer is present in an amount of about 5 to about 50 wt %, for example, in an amount of anywhere from a lower limit of 5, 10, 15, 20, or 25 wt %, to an upper limit of 30, 35, 40, 45, or 50 wt %, based on total weight of the polymers in the layer comprising the propylene-based elastomer.

The propylene-based elastomer is a copolymer of propylene-derived units and units derived from at least one of ethylene or a $C_4$-$C_{10}$ alpha-olefin. The propylene-based elastomer may contain at least about 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 95 wt %, about 94 wt %, about 92 wt %, about 90 wt %, or about 85 wt %, to a lower limit of about 60 wt %, about 65 wt %, about 70 wt %, about 75 wt %, about 80 wt %, about 84 wt %, or about 85 wt %, of the propylene-based elastomer.

The units, or comonomers, derived from at least one of ethylene or a $C_4$-$C_{10}$ alpha-olefin may be present in an amount of about 1 to about 35 wt %, or about 5 to about 35 wt %, or about 7 to about 30 wt %, or about 8 to about 25 wt %, or about 8 to about 20 wt %, or about 8 to about 18 wt %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a fractional melt flow rate of about 0.5 to about 20 g/min.

In preferred embodiments, the comonomer is ethylene, 1-hexene, or 1-octene, with ethylene being most preferred. In embodiments where the propylene-based elastomer comprises ethylene-derived units, the propylene-based elastomer may comprise about 3 to about 25 wt %, or about 5 to about 20 wt %, or about 9 to about 18 wt % of ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or fractional melt flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ alpha-olefin is present, the amount of one comonomer may be less than about 5 wt % of the propylene-based elastomer, but the combined amount of comonomers of the propylene-based elastomer is about 5 wt % or greater.

The propylene-based elastomer may have a triad tacticity of three propylene units, as measured by $^{13}C$ NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 80 J/g or less, or about 70 J/g or less, or about 50 J/g or less, or about 40 J/g or less. The propylene-based elastomer may have a lower limit $H_f$ of about 0.5 J/g, or about 1 J/g, or about 5 J/g. For example, the $H_f$ value may range from a lower limit of about 1.0, 1.5, 3.0, 4.0, 6.0, or 7.0 J/g, to an upper limit of about 35, 40, 50, 60, 70, 75, or 80 J/g.

The propylene-based elastomer may have a percent crystallinity, as determined according to the DSC procedure described herein, of about 2 to about 65%, or about 0.5 to about 40%, or about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or in the range of about 0.5 to about 22%, of the crystallinity of isotactic polypropylene.

Embodiments of the propylene-based elastomer may have a tacticity index m/r from a lower limit of about 4, or about 6, to an upper limit of about 8, or about 10, or about 12. In some embodiments, the propylene-based elastomer has an isotacticity index greater than 0%, or within the range having an upper limit of about 50%, or about 25%, and a lower limit of about 3%, or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkylene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, about 1%, about 3%, or about 5%, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In some embodiments, the propylene-based elastomer has a $T_m$ of about 25 to about 105° C., or about 40 to about 100° C., or about 60 to about 95° C.

The propylene-based elastomer may have a density of about 0.850 to about 0.900 g/cm$^3$, or about 0.860 to about 0.880 g/cm$^3$, at room temperature as measured based on ASTM D1505.

The propylene-based elastomer may have a fractional melt flow rate, as measured based on ASTM D1238, 2.16 kg at 230° C., of at least about 0.5 g/10 min. In some embodiments, the propylene-based elastomer may have a fractional melt flow rate of about 0.5 to about 20 g/10 min, or about 2 to about 18 g/10 min.

The propylene-based elastomer may have an Elongation at Break of less than about 2000%, less than about 1800%, less than about 1500%, or less than about 1000%, as measured based on ASTM D638.

The propylene-based elastomer may have a weight average molecular weight ($M_w$) of about 5,000 to about 5,000,000 g/mole, or about 10,000 to about 1,000,000 g/mole, or about 50,000 to about 400,000 g/mole. The propylene-based elastomer may have a number average molecular weight ($M_n$) of about 2,500 to about 250,000 g/mole, or about 10,000 to about 250,000 g/mole, or about 25,000 to about 250,000 g/mole. The propylene-based elastomer may have a z-average molecular weight ($M_z$) of about 10,000 to about 7,000,000 g/mole, or about 80,000 to about 700,000 g/mole, or about 100,000 to about 500,000 g/mole.

The propylene-based elastomer may have a molecular weight distribution ("MWD") of about 1.5 to about 20, or about 1.5 to about 15, or about 1.5 to about 5, or about 1.8 to about 3, or about 1.8 to about 2.5.

In some embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 to about 90 wt %, based on the total weight of the propylene-based elastomer. The ethylene-derived units are present in an amount of about 8 to about 18 wt %, for example, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt %, based on the total weight of the propylene-based elastomer.

The compositions disclosed herein may include one or more different propylene-based elastomers, i.e., propylene-based elastomers each having one or more different properties such as, for example, different comonomer or comonomer content. Such combinations of various propylene-based elastomers are all within the scope of the invention.

Suitable propylene-based elastomers may be available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins, Netherlands). The particular grade(s) of commercially available propylene-based elastomer suitable for use in the invention can be readily determined using methods commonly known in the art.

Ethylene Polymers

The multilayer film made by the method described herein comprises in at least one outer layer from about 50 to about 100 wt % of a polyethylene.

In one aspect of the invention, the ethylene polymers are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the ethylene polymers are made by the catalysts, activators and processes described in U.S. Pat. Nos. 6,342,566; 6,384,142; 5,741,563; and PCT Publication Nos. WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Ethylene polymers and copolymers that are useful in this invention include those sold by ExxonMobil Chemical Company in Houston Tex., including HDPE, LLDPE, and LDPE; and those sold under the ENABLE™, EXACT™, EXCEED™, ESCORENE™ EXXCO™, ESCOR™, PAXON™, and OPTEMA™ tradenames.

Preferred ethylene homopolymers and copolymers useful in this invention typically have:

1. an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or
2. an $M_w/M_n$ of 1 to 40, preferably 1.6 to 20, or 8 to 25, more preferably 1.8 to 10, more preferably 1.8 to 4, as measured by size exclusion chromatography; and/or
3. a $T_m$ of 30° C. to 150° C., preferably 30° C. to 140° C., preferably 50° C. to 140° C., more preferably 60° C. to 135° C., as determined based on ASTM D3418-03; and/or
4. a crystallinity of 5% to 80%, preferably 10% to 70%, more preferably 20% to 60%, preferably at least 30%, or at least 40%, or at least 50%, as determined based on ASTM D3418-03; and/or
5. a heat of fusion of 300 J/g or less, preferably 1 to 260 J/g, preferably 5 to 240 J/g, preferably 10 to 200 J/g, as determined based on ASTM D3418-03; and/or
6. a crystallization temperature (TO of 15° C. to 130° C., preferably 20° C. to 120° C., more preferably 25° C. to 110° C., preferably 60° C. to 125° C., as determined based on ASTM D3418-03; and/or
7. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or
8. a Shore hardness (D scale) of 10 or more, preferably 20 or more, preferably 30 or more, preferably 40 or more, preferably 100 or less, preferably from 25 to 75 (as measured based on ASTM D 2240); and/or
9. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100; and/or
10. a branching index (g'vis) of 0.97 or more, preferably 0.98 or more, preferably 0.99 or more, preferably 1; and/or
11. a density of about 0.860 to about 0.980 g/cm³ (preferably from 0.880 to 0.960 g/cm³, preferably from 0.910 to 0.940 g/cm³, preferably from 0.915 to 0.930 g/cm³) determined based on ASTM D 1505 using a density-gradient column on a compression-molded specimen that has been slowly cooled to room temperature (i.e. over a period of 10 minutes or more) and allowed to age for a sufficient time that the density is constant within +/−0.001 g/cm³.

The polyethylene may be an ethylene homopolymer, such as HDPE. In one embodiment, the ethylene homopolymer has a molecular weight distribution ($M_w/M_n$) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the ethylene polymer falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the ethylene polymer useful herein is produced by polymerization of ethylene and, optionally, an alpha-olefin with a catalyst having, as a transition metal component, a bis(n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the ethylene polymer is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from 0 wt % to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., divinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the ethylene polymer at up to 10 wt %, preferably at 0.00001 wt % to 2 wt %, preferably 0.002 wt % to 1 wt %, even more preferably 0.003 wt % to 0.5 wt %, based upon the total weight of the ethylene polymer. In some embodiments diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymers have a CDBI of 60% to 80%, preferably between 65% and 80%. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradename EXCEED™ Polyethylene or ENABLE™ Polyethylene.

In one embodiment, the 1% secant flexural modulus of preferred ethylene polymers ranges from 5 MPa to 1000 MPa, preferably from 100 MPa to 800 MPa in another embodiment, and from 10 MPa to 300 MPa in yet another embodiment, wherein a desirable polymer may exhibit any combination of any upper flexural modulus limit with any lower flexural modulus limit.

The crystallinity of the polymer may also be expressed in terms of crystallinity percent. The thermal energy for the highest order of polyethylene is estimated at 290 J/g. That is, 100% crystallinity is equal to 290 J/g. Preferably, the polymer has a crystallinity (as determined by DSC) within the range having an upper limit of 80%, 60%, 40%, 30%, or 20%, and a lower limit of 1%, 3%, 5%, 8%, or 10%. Alternately, the polymer has a crystallinity of 5% to 80%, preferably 10% to 70, more preferably 20% to 60%. Alternatively the polyethylene may have a crystallinity of at least 30%, preferably at least 40%, alternatively at least 50%, where crystallinity is determined The level of crystallinity may be reflected in the melting point. In one embodiment of the present invention, the ethylene polymer has a single melting point. Typically, a sample of ethylene copolymer will show secondary melting peaks adjacent to the principal peak, which is considered together as a single melting point. The highest of these peaks is considered the melting point. The polymer preferably has a melting point (as determined by DSC) ranging from an upper limit of 150° C., 130° C. or 120° C. to a lower limit of 35° C., 40° C., or 45° C.

In particular, the ethylene polymer compositions described herein present in at least one outer layer may be physical blends or in situ blends of more than one type of ethylene polymer or compositions of ethylene polymers with polymers other than ethylene polymers where the ethylene polymer component is the majority component, e.g. greater than 50 wt % of the total weight of the composition. Preferably, the average density of the at least one outer layer ranges from about 0.918 g/cm$^3$ to about 0.927 g/cm$^3$, or from about 0.919 g/cm$^3$ to about 0.925 g/cm$^3$. Preferably, the ethylene polymer composition is a blend of two polyethylenes with different densities. The weight ratio between the polyethylene of a higher density and the polyethylene of a lower density may be about 1:2 to about 1:5, for example, about 1:2, about 1:2.5, about 1:3, about 1:3.5, about 1:4, about 1:4.5, or about 1:5.

In a preferred embodiment, the multilayer film made by the inventive method described herein comprises at least one inner layer between each outer layer and the core layer. The multilayer film can also comprise in at least one inner layer an ethylene polymer composition described herein, preferably in the form of a blend of two polyethylenes. Preferably, at least one inner layer has a density higher than that of the outer layer.

Additives

The film made by the method of the present invention may also contain various additives as is generally known in the art. Examples of such additives include an antioxidant, an ultraviolet light stabilizer, a thermal stabilizer, a slip agent, an antiblock, a pigment, a processing aid, a crosslinking catalyst, a flame retardant, a filler and a foaming agent, etc. In a preferred embodiment, the additives may each individually present at 0.01 wt % to 50 wt %, or from 0.01 wt % to 10 wt %, or from 0.1 wt % to 6 wt %, based upon the weight of the film.

Coextrusion Processes

The present invention generally relates to blown film extrusion and especially coextrusion methods. The term coextrusion in the specification and claims refers to an extrusion process where at least two same or different molten polymer compositions are extruded and bonded together in a molten condition in the die exit. A bubble is blown up by internal air supply. Films are formed, while cooling progressively, after a complex interplay of stretching, orientation and crystallization until the film reaches a take-up device enclosing the top of the bubble, such as a pair of pinch rollers, and the bubble is split into two parts followed by being wound around two winders.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

The inventive method for making a multilayer film is developed based on a discovery that use of a propylene-based elastomer in the layer acting as the inner surface of the bubble during bubble blowing to prepare a multilayer film can generate strong adhesion between the two inner layers upon contact when the bubble collapses, thus leading to one single film structure. This film can be subsequently wound by a single winder without slitting, and the layer comprising the propylene-based elastomer results in the core layer of the final film. Therefore, the number of film layers that a coextrusion line is capable of producing can be greater than that of the equipped extruders by (n−1), with n being the number of extruders.

Preferably, the film made as described herein is symmetrical. More preferably, the inner layers that are mirror images to each other relative to the core layer are extruded from a single extruder.

In one embodiment, a method for making a multilayer film comprising five layers by a coextrusion line comprising three extruders comprises the steps of: (a) extruding a core layer from a first extruder; (b) extruding two outer layers from a second extruder, wherein the core layer is between the two outer layers; (c) extruding two inner layers from a third extruder, wherein each inner layer is between the core layer and each outer layer; and (d) combining the layers to form a multilayer film comprising five layers; wherein the core layer comprises a propylene-based elastomer having at least about 60 wt % propylene-derived units and about 3 to about 25 wt % ethylene-derived units, based on total weight of the propylene-based elastomer, and a heat of fusion of less than about 80 J/g; wherein the two outer layers each comprise from about 50 to about 100 wt % of a polyethylene.

Film Structures

The film made as described herein may have an A/Y/A structure wherein A is an outer layer and Y is the core layer in contact with the outer layer. Suitably one or both outer layers are a skin layer forming one or both film surfaces. The composition of the A layers may be the same or different, but conform to the limitations set out herein. The film may have an A/B/X/B/A structure wherein A are outer layers and X represents the core layer and B are inner layers between the core layer and each outer layer. The composition of the B layers may also be the same or different, but conform to the limitations set out herein. The A and B layers may have the same composition or different compositions. Preferably, at least one of the B layers has a different composition with a density higher than that of the A layer.

In one preferred embodiment, the film has a five-layer A/B/X/B/A structure, comprising: (a) in a core layer a propylene-based elastomer has at least about 60 wt % propylene-derived units and about 3 to about 25 wt % ethylene-derived units, based on total weight of the propylene-based elastomer, and a heat of fusion of less than about 80 J/g; (b) in two outer layers a blend of two polyethylenes, wherein the core layer is between the two outer layers; and (c) in two inner layers a blend of two polyethylenes, wherein each inner layer is between the core layer and each outer layer; wherein each inner layer has a density at least about 0.006 g/cm$^3$ higher than that of the outer layer, wherein the two outer layers are identical and the two inner layers are identical. Preferably, the core layer is about 15% to about 30% of the total volume of the film.

In particular, the five-layer film may have improved mechanical properties including at least one of the following: (a) a stiffness (1% Secant Modulus) at least about 20% lower than that of a comparative film in both the Machine Direction (MD) and the Transverse Direction (TD), (b) a dart impact at least about 50% higher than that of a comparative film, and (c) an Elmendorf tear strength at least about 10% higher than that of a comparative film in the Machine Direction (MD), without significantly compromised optical properties, preferably even accompanied by a haze reduced by at least about 20%, in comparison with a comparative film.

In multilayer constructions, other layer(s) between the core layer and the outer layers may be any layer typically included in multilayer film structures. For example, the other layer or layers may be:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene, and/or butane, and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and non-wovens (particularly polypropylene spunbond fibers or non-wovens), and substrates coated with inks, dyes, pigments, and the like.

In particular, the multilayer film prepared by the inventive method described herein can also include layers comprising materials such as ethylene vinyl alcohol (EVOH), polyamide (PA), or polyvinylidene chloride (PVDC), so as to obtain barrier performance for the film.

The thickness of the films may range from 5 to 200 μm in general and is largely determined by the intended use and properties of the film. Stretch films may be thin; those for shrink films or heavy duty bags are much thicker. Conveniently the film has a thickness of from 5 to 200 μm, preferably from 10 to 150 μm, and more preferably from 20 to 80 μm. The thickness of each of the outer layers may be at least 7% of the total thickness, preferably from 10 to 40%. The core layer may be less than about 40%, preferably from about 15% to about 30%, of the total volume (thickness) of the film.

Films with high clarity may be provided having a thickness from 10-80 μm preferably with an A/B/X/B/A structure. The outer (A) layer composition and the inner (B) layer composition may preferably both consist substantially of linear polyethylene, such as metallocene LLDPE (mLLDPE), and the core (X) layer may consist substantially of a propylene-based elastomer as described herein. Suitably, the core layer may be present in an amount of about 15% to about 30% of the total volume (thickness) of the film. Preferably, the outer layer contains a blend of two mLLDPEs, having an average density of 0.919 g/cm$^3$ to about 0.925 g/cm$^3$. The inner layer also contains a blend of two mLLDPEs, showing an average density of at least about 0.006 g/cm$^3$ higher than that of the outer layer.

Films with barrier properties may be provided with an A/B/C/D/X/D/C/B/A structure. The outer (A) layer composition may preferably both consist substantially of linear polyethylene and the core (X) layer may consist substantially of a propylene-based elastomer as described herein. Suitably, C layer may be primarily made of barrier materials, such as EVOH or PA, and B and D layers may be chemically modified resins, such as a graft LLDPE, serving as tie layers used to bond the polar barrier materials to the core and outer layers. Enhanced barrier performance can also be expected if the inventive method is applied to make such films.

Film Properties

The films prepared according to the present invention may be adapted to form flexible packaging films for a wide variety of applications such as cling film, low stretch film, non-stretch wrapping film, pallet shrink, over-wrap, agricultural, and collation shrink film and laminated films, including stand-up pouches. The film structures may be used for bags are prepared such as sacks, trash bags and liners, industrial liners, produce bags, and heavy duty bags. The bags may be made on vertical or horizontal form, fill and seal equipment. The film may be used in flexible packaging, food packaging, e.g., fresh cut produce packaging, frozen food packaging, bundling, packaging and unitizing a variety of products. A package comprising a film prepared by the method described herein can be heat sealed around package content. The film and package can display outstanding optical properties as demonstrated by high clarity and low haze and also reduced stiffness due to introduction of a propylene-based elastomer, which is important for certain high-end applications characterized by soft hand feel.

By suitable selection of process conditions and compositions, a five-layer film may be produced by the inventive method with an A/B/X/B/A structure having at least one of the following: (a) a stiffness represented by 1% Secant Modulus at least about 20% lower than that of a comparative film in both the Machine Direction (MD) and the Transverse Direction (TD), (b) a haze at least about 20% lower than that of a comparative film, (c) a dart impact at least about 50% higher than that of a comparative film, and (d) an Elmendorf tear strength at least about 10% higher than that of a comparative film in the Machine Direction (MD), while maintaining or improving other properties including high clarity of the comparative film. Using the present invention, with the improved properties referred to individually above, the long-standing difficulty in balancing mechanical and optical properties of a film used for packaging application requiring, for example, both low stiffness and high clarity can be well addressed.

Other embodiments of the present invention can include:
1. A method for making a multilayer film by a coextrusion line comprising two extruders, comprising the steps of:
   (a) extruding a core layer from a first extruder;
   (b) extruding two outer layers from a second extruder; and
   (c) combining the core layer and the two outer layers to form a multilayer film;
   wherein the core layer (i) comprises a propylene-based elastomer having at least about 60 wt % propylene-derived units and about 3 to about 25 wt % ethylene-derived units, based on total weight of the propylene-based elastomer, and a heat of fusion of less than about 80 J/g, (ii) is between the two outer layers, and (iii) has an equal number of layer(s) on both sides of it; wherein at least one outer layer comprises from about 50 to about 100 wt % of a polyethylene.
2. The method of paragraph 1, wherein the core layer is less than about 40% of the total volume of the film.
3. The method of paragraph 1 or 2, wherein the film comprises at least one inner layer between each outer layer and the core layer.
4. The method of paragraph 3, wherein at least one inner layer has a density higher than that of either outer layer.
5. The method of any of paragraphs 1 to 4, wherein the film is symmetrical.
6. The method of paragraph 5, wherein the inner layers that are mirror images to each other relative to the core layer are extruded from a single extruder.
7. The method of any of paragraphs 1 to 6, wherein the multilayer film comprises five layers.
8. The method of any of paragraphs 1 to 7, wherein the multilayer film is formed by blown extrusion.
9. The method of paragraph 8, wherein the multilayer film is formed without a slitting step prior to winding.

10. A method for making a multilayer film comprising five layers by a coextrusion line comprising three extruders, comprising the steps of:
 (a) extruding a core layer from a first extruder;
 (b) extruding two outer layers from a second extruder, wherein the core layer is between the two outer layers;
 (c) extruding two inner layers from a third extruder, wherein each inner layer is between the core layer and each outer layer; and
 (d) combining the layers to form a multilayer film comprising five layers;
 wherein the core layer comprises a propylene-based elastomer having at least about 60 wt % propylene-derived units and about 3 to about 25 wt % ethylene-derived units, based on total weight of the propylene-based elastomer, and a heat of fusion of less than about 80 J/g; wherein the two outer layers both comprise from about 50 to about 100 wt % of a polyethylene.

11. The method of paragraph 10, wherein the core layer is less than about 40% of the total volume of the film.

12. The method of paragraph 10 or 11, wherein the two outer layers are identical.

13. The method of any of paragraphs 10 to 12, wherein at least one inner layer has a density higher than that of the outer layer.

14. The method of any of paragraphs 10 to 13, wherein the two inner layers are identical.

15. A multilayer film, comprising:
 (a) in a core layer a propylene-based elastomer has at least about 60 wt % propylene-derived units and about 3 to about 25 wt % ethylene-derived units, based on total weight of the propylene-based elastomer, and a heat of fusion of less than about 80 J/g;
 (b) in two outer layers a blend of two polyethylenes, wherein the core layer is between the two outer layers; and
 (c) in two inner layers a blend of two polyethylenes, wherein each inner layer is between the core layer and each outer layer;
 wherein each inner layer has a density of at least about 0.006 g/cm$^3$ higher than that of the outer layer, wherein the two outer layers are identical and the two inner layers are identical.

16. The film of paragraph 15, wherein the film is a five-layer film made by a blown film coextrusion line with three extruders.

17. The film of paragraph 16, wherein the core layer is about 15% to about 30% of the total volume of the film.

18. The film of paragraph 16 or 17, wherein the film has at least one of the following: (a) a stiffness (1% Secant Modulus) of at least about 20% lower than that of a comparative film in both the Machine Direction (MD) and the Transverse Direction (TD), (b) a haze at least about 20% lower than that of a comparative film, (c) a dart impact at least about 50% higher than that of a comparative film, and (d) an Elmendorf tear strength at least about 10% higher than that of a comparative film in the Machine Direction (MD).

EXAMPLES

The present invention, while not meant to be limited by, may be better understood by reference to the following examples and tables.

Example 1

Figure 1:
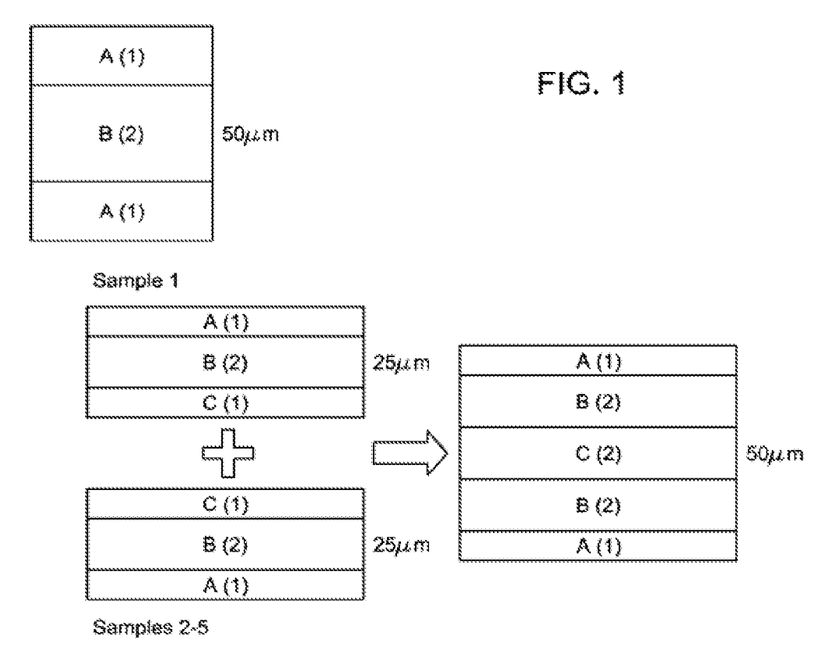
FIG. 1 depicts a schematic representation of film structures for each of the samples in Example 1.

A 50 μm multilayer film was prepared for each sample on a Jinming three-layer coextrusion blown film line (Guangdong Jinming Machinery Co., Ltd.). To ensure the same thickness for all the samples, the bubble is downgauged by half (thickness of the bubble is 25 μm). VISTAMAXX™ 6102FL propylene-based elastomer (ExxonMobil Chemical Company, Houston, Tex., USA) (density: 0.862 g/cm$^3$) was used in Samples 2, 3, and 4. VISTAMAXX™ 6202FL propylene-based elastomer (ExxonMobil Chemical Company, Houston, Tex., USA) (density: 0.861 g/cm$^3$) was used in Sample 5. ENABLE™ 20-05CH mPE resin (ExxonMobil Chemical Company, Houston, Tex., USA) (density: 0.920 g/cm$^3$), ENABLE™ 27-03CH mPE resin (ExxonMobil Chemical Company, Houston, Tex., USA) (density: 0.927 g/cm$^3$), and EXCEED™ 1018CA mPE resin (ExxonMobil Chemical Company, Houston, Tex., USA) (density: 0.918 g/cm$^3$) was used in all five samples. Sample 1 is provided as a comparative film of three layers, prepared by a conventional coextrusion process with a slitting step prior to winding, so as to illustrate the reference effects of a film without the core layer comprising a propylene-based elastomer described herein. Samples 2-5 were prepared by the inventive method with a five-layer structure. Structure-wise formulations, densities, and processing conditions of the film samples are listed below in Table 1. A schematic representation of film structures for all the samples is shown in FIG. 1. A microscopic image demonstrating layer distribution of Sample 4 is presented in FIG. 2.

Figure 2:
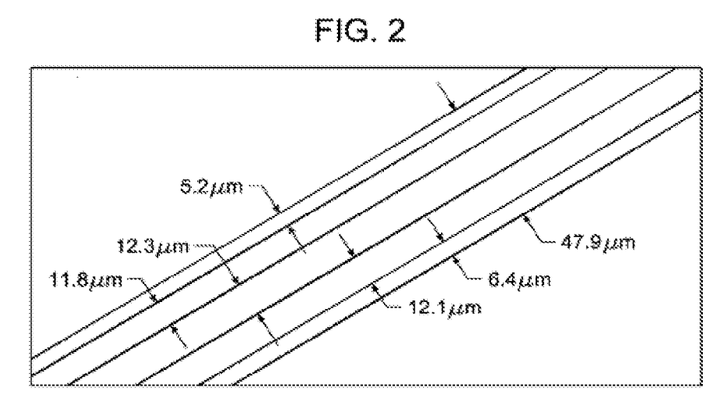
FIG. 2 depicts layer distribution under microscope for sample 4 in Example 1.

The outlined five-layer distribution of Sample 4 seen from FIG. 2 demonstrates that by applying a propylene-based elastomer to the core layer, adhesion established between the two parts of the blown bubble can be strong enough to form one film structure.

Example 2

Example 2 illustrates the effect of introducing a propylene-based elastomer into the core layer on mechanical properties, especially stiffness represented by 1% Secant Modulus, of the five-layer inventive films of Samples 2-5 in comparison with the three-layer comparative film of Sample 1.

Tensile properties of the films were measured by a method which is based on ASTM D882 with static weighing and a constant rate of grip separation using a Zwick 1445 tensile tester with a 200N. Since rectangular shaped test samples were used, no additional extensometer was used to measure extension. The nominal width of the tested film sample is 15 mm and the initial distance between the grips is 50 mm. The film samples were conditioned for at least 40 hours at a temperature of 23±2° C. and a relative humidity of 50±10%, and were measured in both machine direction (MD) and Transverse Direction (TD). Tensile strength at break is defined as the tensile stress at break point during the extension test, expressed in load per unit area (MPa). Elongation at break is defined as the strain at the corresponding break point, expressed as a change in length per unit of original length multiplied with a factor 100(%). Energy to break is calculated by integration of the area under the stress-strain curve. A pre-load of 0.1N was used to compensate for the so called toe region at the origin of the stress-strain curve. The result is expressed in energy per unit of volume of the original gauge region of the sample (mJ/mm$^3$) 1% Secant modulus is calculated by drawing a tangent through two well defined points on the stress-strain curve. The constant rate of separation of the grips is 5 mm/min upon reaching the pre-load, 5 mm/min to measure 1% Secant modulus (up to 1% strain). The reported value corresponds to the stress at 1% strain (with x correction).

The result is expressed as load per unit area multiplied with a factor of 100 (MPa). The value is an indication of the film stiffness in tension. The 1% secant modulus is used for thin film and sheets as no clear proportionality of stress to strain exists in the initial part of the curve.

dropped from a height of 0.66±0.01 m was employed. Dart impact measures the energy causing a film to fail under specified conditions of impact of a freely-falling dart. This energy is expressed in terms of the weight (mass) of the dart falling from a specified height, which would result in 50% failure of tested samples. Samples have a minimum width of 20 cm and a recommended length of 10 m, and were conditioned at a temperature of 23° C.±2° C. and a relative humidity of 50%±10% for at least 40 hours prior to the test. Samples are generally free of pinholes, wrinkles, folds or other apparent defects, unless such defects constitute variables by request.

TABLE 1

Structure-wise formulations (wt %), densities and processing conditions for film samples of Example 1

| | Sample No. | | | | | | | | | | | | | |
|---|---|---|---|---|---|---|---|---|---|---|---|---|---|---|
| | 1 | | 2 | | | 3 | | | 4 | | | 5 | | |
| Layer | A | B | A | B | C | A | B | C | A | B | C | A | B | C |
| Vistamaxx™ 6102FL | — | — | — | — | 100 | — | — | 100 | — | — | 100 | — | — | — |
| Vistamaxx™ 6202FL | — | — | — | — | — | — | — | — | — | — | — | — | — | 100 |
| Enable™ 20-05CH | 25 | — | 25 | — | — | 25 | — | — | 25 | — | — | 25 | — | — |
| Enable™ 27-03CH | — | 75 | — | 75 | — | — | 75 | — | — | 75 | — | — | 75 | — |
| Exceed™ 1018CA | 75 | 25 | 75 | 25 | — | 75 | 25 | — | 75 | 25 | — | 75 | 25 | — |
| Layer Density (g/cm³) | 0.919 | 0.925 | 0.919 | 0.925 | 0.862 | 0.919 | 0.925 | 0.862 | 0.919 | 0.925 | 0.862 | 0.919 | 0.925 | 0.861 |
| Layer Ratio (vol %) | 25 | 50 | 12.5 | 25 | 25 | 12.5 | 25 | 25 | 12.5 | 25 | 25 | 12.5 | 25 | 25 |
| Film Density (g/cm³) | 0.922 | | 0.908 | | | 0.908 | | | 0.908 | | | 0.908 | | |
| Nip Roll Pressure (bar) | 4 | | 4 | | | 6 | | | 4 | | | 4 | | |
| Core Layer Melt Temperature (° C.) | 205 | | 205 | | | 205 | | | 225 | | | 225 | | |

TABLE 2

Mechanical properties of film samples of Example 1

| | Tensile Properties | | | | | | | | | | | |
|---|---|---|---|---|---|---|---|---|---|---|---|---|
| | MD | | | | | | TD | | | | | |
| | Tensile at Break | | Elongation at Break | Energy to Break | | 1% Secant Modulus | | Tensile at Break | | Elongation at Break | Energy to Break | | 1% Secant Modulus | |
| Sample No. | MPa | N | % | mJ/mm³ | mJ | MPa | N | MPa | N | % | mJ/mm³ | mJ | MPa | N |
| 1 | 56.8 | 44.0 | 576 | 142 | 5495 | 259 | 200 | 59.5 | 45.0 | 686 | 156 | 5897 | 285 | 215 |
| 2 | 59.2 | 44.4 | 534 | 141 | 5288 | 199 | 149 | 50.2 | 38.0 | 704 | 136 | 5141 | 226 | 171 |
| 3 | 59.4 | 45.8 | 538 | 143 | 5513 | 200 | 154 | 48.9 | 38.0 | 709 | 134 | 5206 | 233 | 181 |
| 4 | 60.2 | 45.5 | 527 | 143 | 5405 | 207 | 156 | 46.9 | 35.1 | 712 | 130 | 4858 | 220 | 164 |
| 5 | 56.7 | 44.1 | 520 | 134 | 5206 | 198 | 154 | 42.5 | 32.2 | 686 | 117 | 4431 | 226 | 171 |

| | Dart Impact | | Elmendorf Tear | | | | Puncture | | | |
|---|---|---|---|---|---|---|---|---|---|---|
| | | | MD | | TD | | $F_{max}$ | | Energy at $F_{max}$ | |
| Sample No. | g/µm | g | g/µm | g | g/µm | g | N/µm | N | mJ/µm | mJ |
| 1 | 11.52 | 575.9 | 7.08 | 360 | 19.48 | 997 | 1.20 | 61 | 41.57 | 2120 |
| 2 | 18.96 | 947.9 | 8.07 | 75 | out of range | — | 0.99 | 33 | 37.85 | 1870 |
| 3 | 18.98 | 929.9 | 9.20 | 478 | out of range | — | 1.16 | 59 | 42.49 | 2150 |
| 4 | 18.96 | 947.9 | 8.66 | 442 | out of range | — | 1.14 | 57 | 41.97 | 2090 |
| 5 | 18.24 | 911.9 | 6.23 | 318 | out of range | — | 1.15 | 58 | 43.68 | 2210 |

Dart impact was measured by a method following ASTM D1709 on a Dart Impact Tester Model C from Davenport Lloyd Instruments in which a pneumatically operated annular clamp is used to obtain a uniform flat specimen and the dart is automatically released by an electro-magnet as soon a sufficient air pressure is reached on the annular clamp. A dart with a 38.10±0.13 mm diameter hemispherical head Elmendorf tear strength was measured based on ASTM D1922-09 using the Tear Tester 83-11-01 from TMI Group of Companies and measures the energy required to continue a pre-cut tear in the test sample. Samples were cut across the web using the constant radius tear die and were free of any visible defects (e.g., die lines, gels, etc.). Samples were conditioned at a temperature of 23° C.±2° C. and a relative humidity of 50%±10% for at least 40 hours prior to the test.

Puncture resistance was measured based on ASTM D5748, which is designed to provide load versus deformation response under biaxial deformation conditions at a constant relatively low test speed (change from 250 mm/min to 5 mm/min after reach pre-load (0.1N)). Film samples were tested below the cross-head area with the 2.5 kN load cell. The sample was about 550 mm*900 mm in size, and were conditioned for at least 40 hours at a temperature of 23±2° C. and a relative humidity of 50±10%. Maximum Puncture force is the maximum load achieved by the film sample before the break point, expressed in (N). Puncture energy to break is the total energy absorbed by the film sample at the moment of maximum load, which is the integration of the area up to the maximum load under the load-deformation curve, expressed in (mJ).

Figure 3:
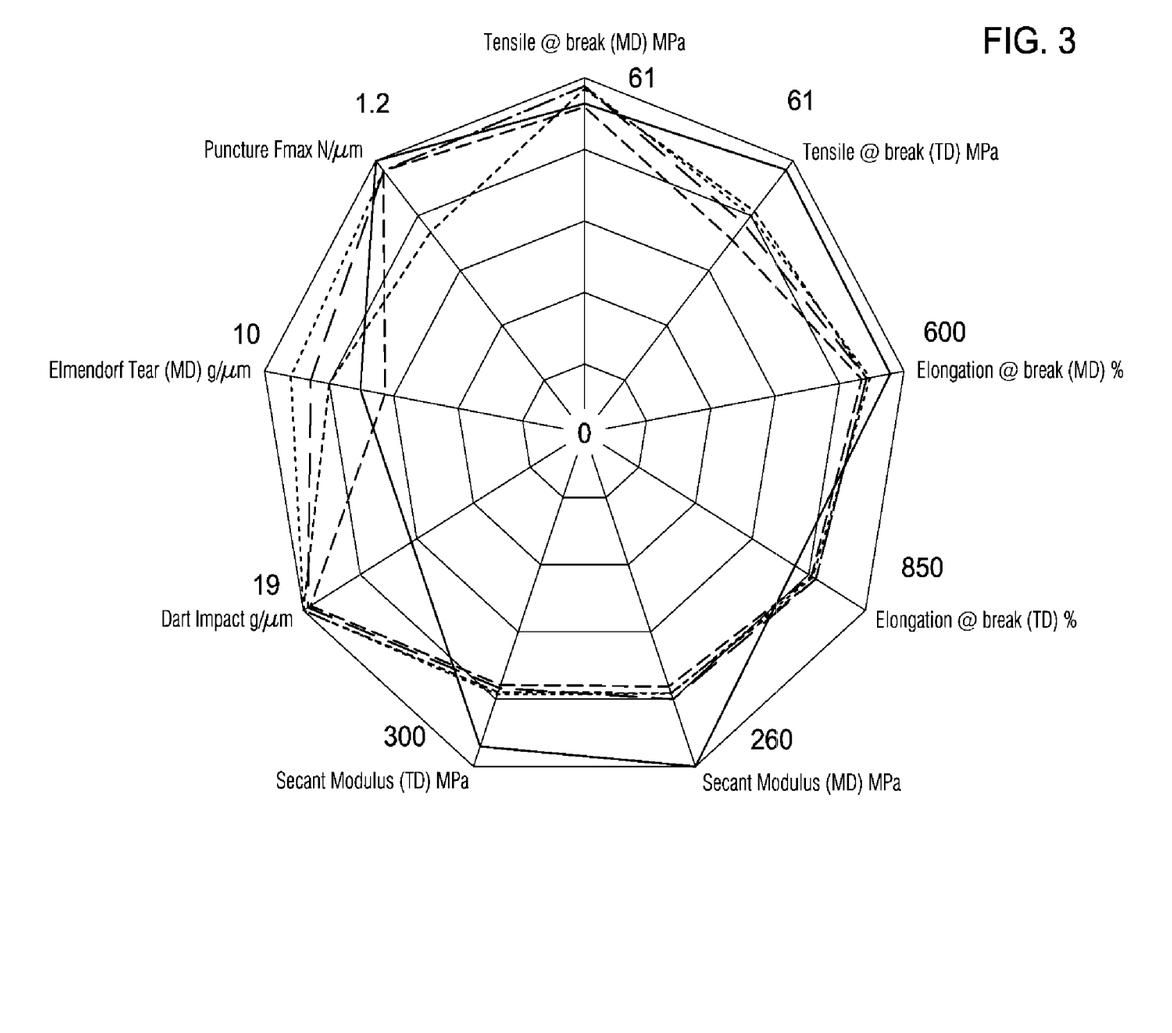
FIG. 3 depicts stiffness (1% Secant Modulus) and other mechanical properties for each of the samples in Example 1.

Test results are listed in Table 2 and an overall status of the measured mechanical properties is depicted in FIG. 3.

It can be observed from Table 2 and FIG. 3 that compared to Sample 1 of the comparative film, stiffness of Samples 2-5 of the inventive films was reduced by more than 22% in both MD and TD, while other mechanical properties mainly remained at a comparable level or were even improved. Specifically, advantages of the inventive films over the comparative film were further reflected by an increase of more than 60% in dart impact and a general increase of more than about 13% in Elmendorf tear strength in MD (TD values beyond the Tear Tester's measurement range of 20 g/μm), both of which are valuable mechanical properties of films used for various applications.

Example 3

Example 3 illustrates the effect of introducing a propylene-based elastomer into the core layer on optical properties of the five-layer inventive films of Samples 2-5 in comparison with the three-layer comparative film of Sample 1.

Samples were conditioned at 23° C.±2° C. and 50%±10% relative humidity for at least 40 hours prior to determination of all optical properties.

Clarity was measured based on ASTM D1746 using Zebedee Clarity Meter CL-100 (Zebedee Corporation, Iowa, USA) and is defined as regular transmitted light that is deflected less than 0.1° from the axis of incident light through the bulk of the film sample.

Haze (wide-angle scattering) was measured based on ASTM D1003 using a haze meter Haze-Guard Plus AT-4725 from BYK Gardner and is defined as the percentage of transmitted light passing through the bulk of the film sample that is deflected by more than 2.5°. Total transmittance is a measurement of how much light passes through a film (ratio of total transmitted light to incident light). The haze is the ratio in % of the diffused light relative to the total light transmitted by the sample film.

Gloss was measured based on ASTM D-2457 using a gloss meter Micro Gloss 45 from BYK Gardner. A light source is beamed onto the plastic surface at an angle of 45° and the amount of light reflected is measured as a Gloss Unit (GU) value. The higher the gloss value is, the shinier the plastic is.

Figure 4:
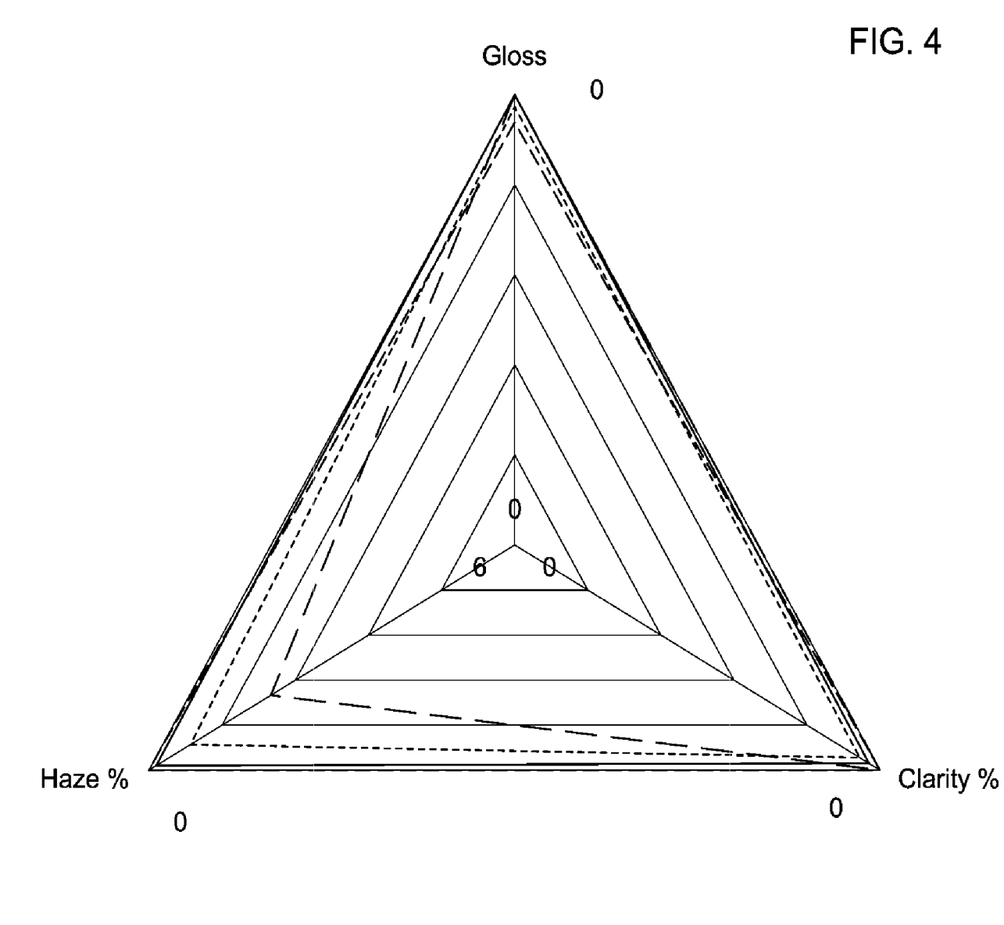
FIG. 4 depicts optical properties for each of the samples in Example 1.

Test results are listed in Table 3 and an overall status of the measured optical properties is depicted in FIG. 4.

As shown in Table 3 and FIG. 4, optical properties are not compromised in conjunction with reduced stiffness with use of a propylene-based elastomer for the core layer, indicating a good balance has been achieved between the mechanical and optical properties desired for specific packaging applications preferring soft film with high clarity.

Particularly, without being bound by theory, it is believed that applying a propylene-based elastomer into the core layer of a multilayer film in a coextrusion process can desirably reduce stiffness of a film without impairing but preferably improving existing optical properties, such as high clarity. In addition, the inventive method has established an efficient and cost-effective way to prepare multilayer films, particularly those with symmetrical structures relative to the core layer, for various applications.

TABLE 3

Optical properties of film samples of Example 1

| Sample No. | Haze | Clarity | Gloss 45° |
|---|---|---|---|
| 1 | 4.01 | 79.7 | 83.2 |
| 2 | 3.07 | 75.3 | 83.0 |
| 3 | 3.04 | 80.0 | 77.7 |
| 4 | 3.08 | 76.0 | 83.1 |
| 5 | 3.32 | 74.7 | 82.2 |

Example 4

Example 4 illustrates sealing performance demonstrated by the five-layer inventive samples of Samples 2-5 in comparison with the three-layer comparative film of Sample 1 at a sealing temperature ranging from 100° C. to 160° C.

Figure 5A:
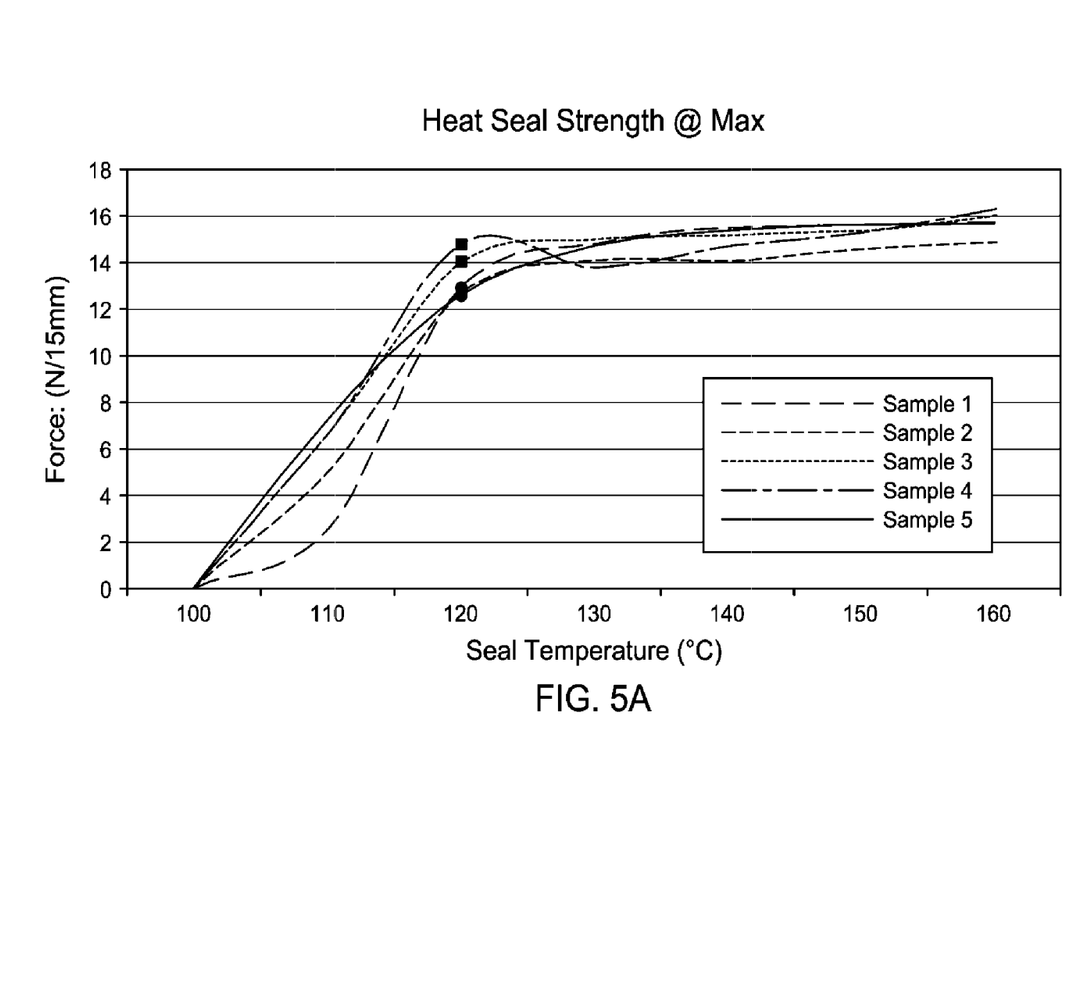
FIG. 5a depicts seal strengths at max over a range of sealing temperatures for each of Samples 1-5.
Figure 5B:
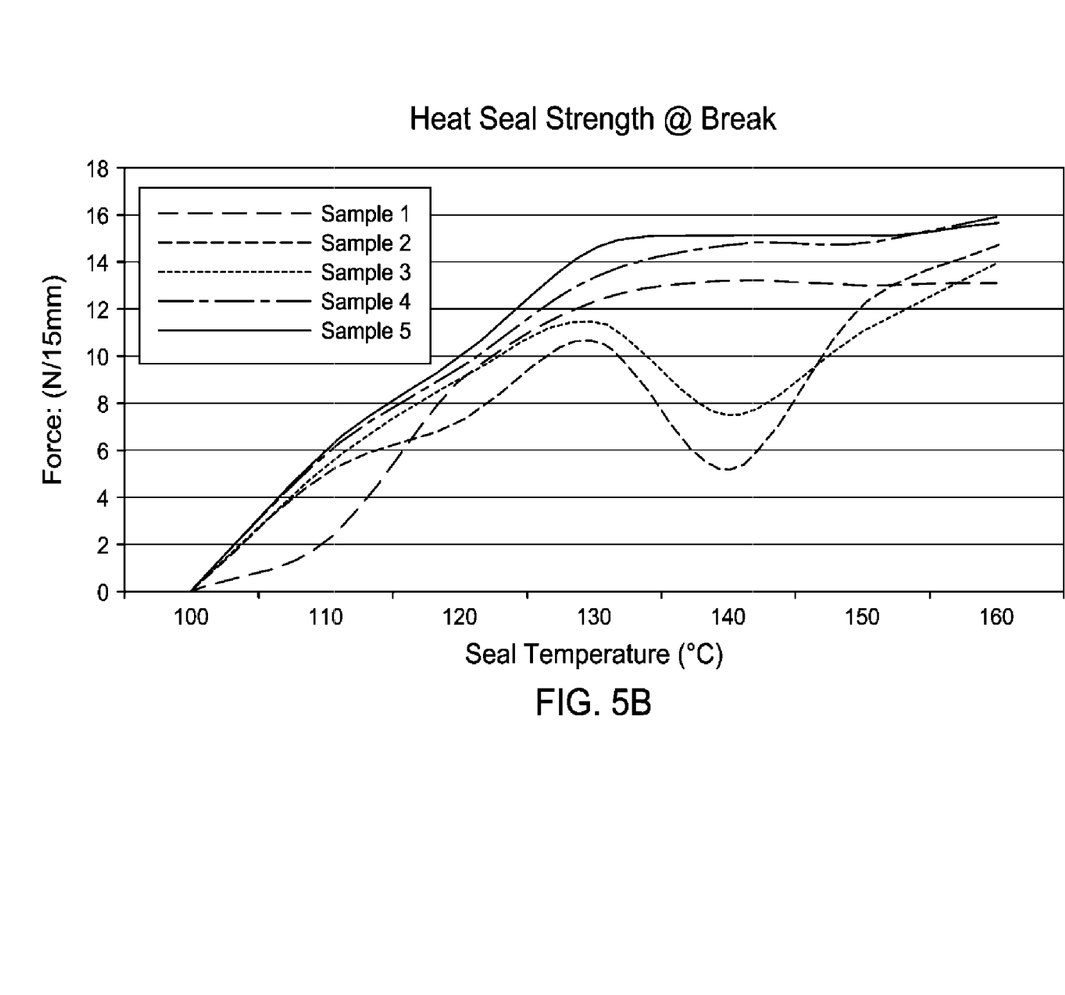
FIG. 5b depicts seal strengths at break over a range of sealing temperatures for each of Samples 1-5.

Seal strength was measured herein based on ASTM F2029 and ASTM F88 using a Zwick Tensile Tester pulled at 90° angle from the seal at a speed of 500 mm/min after samples with a width of 15 mm are conditioned in the constant temperature lab for at least 40 hours at a temperature of 23° C.±2° C. and at a relative humidity of 50%±10%. The results are depicted in FIG. 5.

Figure 6:
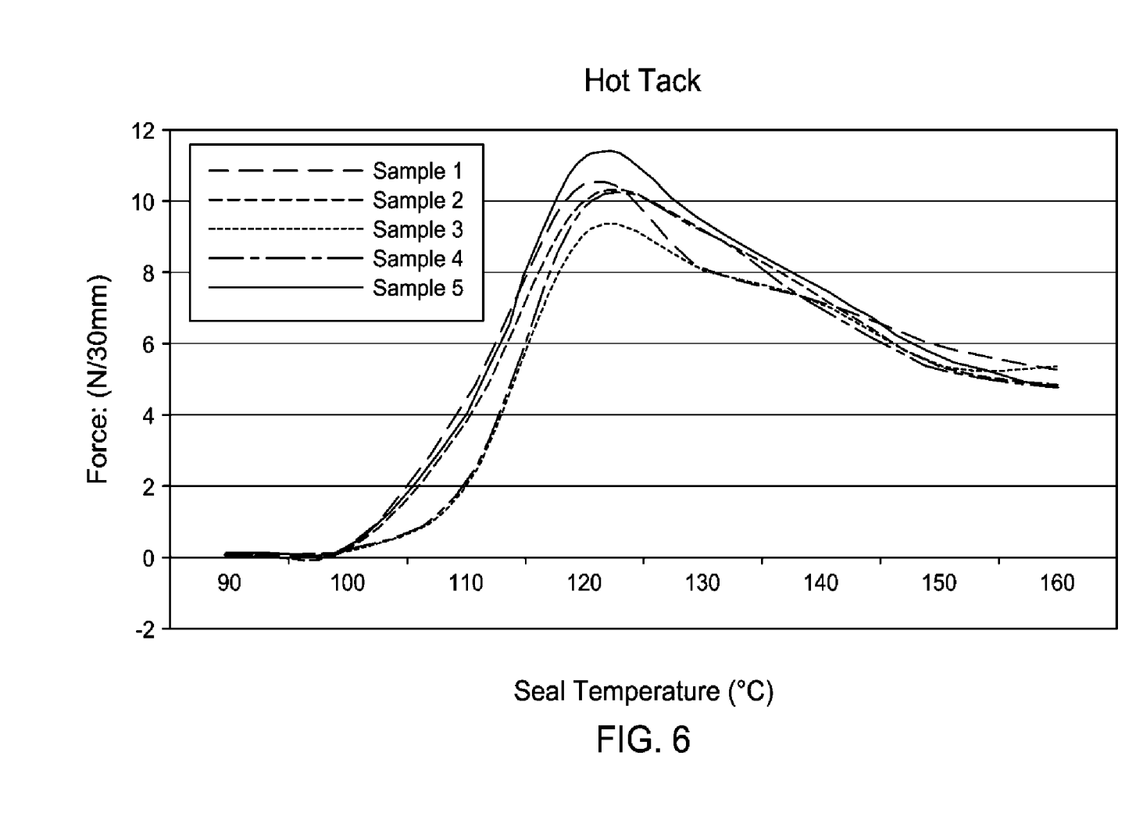
FIG. 6 depicts hot tack forces over a range of sealing temperatures for each of the samples in Example 1.

Hot tack refers to the seal strength of a seal while it is still in a molten state, which was determined based on ASTM F1921-12 using a J&B Hot Tack Tester Model 4000 with a 0.5 sec dwell time, with a 0.5 MPa bar pressure pulled at a speed of 200 mm/sec after 0.4 sec of welding seal. The results are presented in FIG. 6.

Consistent high adhesion in the core layer was demonstrated by the highest film integrity without delamination at a sealing temperature ranging from 100° C. to 160° C. observed in Sample 5, in which VISTAMAXX™ 6202FL propylene-based elastomer was used with a melt temperature of 225° C. Similar adhesion was also achieved by Sample 4 but at a higher sealing temperature above 130° C., in which VISTAMAXX™ 6102FL propylene-based elastomer was used with a melt temperature of 225° C.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A multilayer film, comprising:
   (a) in a core layer a propylene-based elastomer has at least about 60 wt % propylene-derived units and about 3 to about 25 wt % ethylene-derived units, based on total weight of the propylene-based elastomer, and a heat of fusion of less than about 80 J/g, wherein the core layer has a density from about 0.860 to about 0.880 g/cm$^3$, at room temperature as measured based on ASTM D1505, wherein the core layer is about 15% to about 30% of the total volume of the film;
   (b) in two outer layers a blend of two polyethylenes, wherein the core layer is between the two outer layers; and
   (c) in two inner layers a blend of two polyethylenes, wherein each inner layer is between the core layer and each outer layer;
   wherein each inner layer has a density of at least about 0.006 g/cm$^3$ higher than that of the outer layer on the same side of the core layer, wherein the two outer layers are identical and the two inner layers are identical.

2. The method of claim 1, wherein the film is symmetrical.

3. The film of claim 1, wherein the film is a five-layer film made by a blown film coextrusion line with three extruders.

4. The film of claim 1, wherein the film has a haze at least about 20% lower than that of a comparative film, wherein the comparative film is free of the core layer comprising the propylene-based elastomer, but otherwise identical to the film in terms of layers' compositions and the comparative film's overall thickness.

5. The film of claim 1, wherein the film has a dart impact at least about 50% higher than that of a comparative film, wherein the comparative film is free of the core layer comprising the propylene-based elastomer, but otherwise identical to the film in terms of layers' compositions and the comparative film's overall thickness.

6. The film of claim 1, wherein the film has an Elmendorf tear strength at least about 10% higher than that of a comparative film in the Machine Direction (MD), wherein the comparative film is free of the core layer comprising the propylene-based elastomer, but otherwise identical to the film in terms of layers' compositions and the comparative film's overall thickness.

7. The film of claim 1, wherein the film has a stiffness (1% Secant Modulus) of at least about 20% lower than that of a comparative film in both the Machine Direction (MD) and the Transverse Direction (TD), wherein the comparative film is free of the core layer comprising the propylene-based elastomer, but otherwise identical to the film in terms of layers' compositions and the comparative film's overall thickness.

8. A multilayer film, comprising:
   (a) a core layer comprising a propylene-based elastomer has at least about 60 wt % propylene-derived units and about 3 to about 25 wt % ethylene-derived units, based on total weight of the propylene-based elastomer, and a heat of fusion of less than about 80 J/, wherein the core layer has a density from about 0.860 to about 0.880 g/cm3, at room temperature as measured based on ASTM D1505;
   (b) in two outer layers a blend of two polyethylenes, wherein the core layer is between the two outer layers; and
   (c) in two inner layers a blend of two polyethylenes, wherein each inner layer is between the core layer and each outer layer,
   wherein the film is a five-layer film having a thickness from 20 μm to 80 μm,
   wherein the core layer is about 15% to about 30% of the total volume of the film,
   wherein each inner layer has a density of at least about 0.006 g/cm$^3$ higher than that of the outer layer on the same side of the core layer, wherein the two outer layers are identical and the two inner layers are identical.

* * * * *